(12) United States Patent
Sato et al.

(10) Patent No.: US 6,552,878 B2
(45) Date of Patent: Apr. 22, 2003

(54) MAGNETIC DISK APPARATUS

(75) Inventors: Kazutaka Sato, Kashiwa (JP); Irizo Naniwa, Odawara (JP); Shigeo Nakamura, Odawara (JP); Takashi Yamaguchi, Tsuchiura (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/103,732

(22) Filed: Mar. 25, 2002

(65) Prior Publication Data

US 2002/0097529 A1 Jul. 25, 2002

Related U.S. Application Data

(63) Continuation of application No. 09/368,570, filed on Aug. 5, 1999, now abandoned.

(30) Foreign Application Priority Data

Aug. 5, 1998 (JP) .............................. 10-221312

(51) Int. Cl.[7] .............................. G11B 21/24; G11B 5/56
(52) U.S. Cl. ................................................... 360/294.4
(58) Field of Search .......................... 360/294.7, 294.4, 360/294.1, 294.2, 294.3, 294.5, 294, 290

(56) References Cited

U.S. PATENT DOCUMENTS

| | | | |
|---|---|---|---|
| 5,247,493 A | 9/1993 | Kime et al. | 369/13.17 |
| 5,764,444 A * | 6/1998 | Imamura et al. | 360/294.4 |
| 5,991,114 A | 11/1999 | Huang et al. | 360/75 |
| 6,105,421 A | 8/2000 | Yao et al. | 73/105 |
| 6,108,175 A | 8/2000 | Hawwa et al. | 360/294.4 |
| 6,166,890 A * | 12/2000 | Stefansky et al. | 360/294.4 |
| 6,222,706 B1 | 4/2001 | Stefansky et al. | 360/294.5 |
| 6,327,120 B1 * | 12/2001 | Koganezawa et al. | 310/311 |
| 2002/0030943 A1 * | 3/2002 | Kikkawa et al. | 360/294.3 |

FOREIGN PATENT DOCUMENTS

| | | |
|---|---|---|
| EP | 0931329 | 12/1999 |
| JP | 5109058 | 4/1993 |
| JP | 973746 | 3/1997 |

* cited by examiner

*Primary Examiner*—William Klimowicz
*Assistant Examiner*—Julie Anne Watko
(74) *Attorney, Agent, or Firm*—Antonelli, Terry, Stout & Kraus, LLP

(57) ABSTRACT

In a magnetic head supporting apparatus having a second actuator for fine movement in addition to a first actuator having a voice coil motor for coarse movement, the second actuator is fixed so as to bridge the upper surface of a suspension and the upper surface of a suspension supporting member to support the suspension, and the second actuator is a plate-shaped structure which has two polarization regions separated by a non-polarized region and is formed by laminating piezoelectric flat plates in which the polarizing directions and the directions of electric fields to be applied are thickness directions. Thus, a magnetic disk apparatus which can be driven by a low voltage, a displacement in the vertical direction of the suspension is small, a productivity is high, and a recording density is high can be realized.

10 Claims, 8 Drawing Sheets

B CROSS SECTION

THICKNESS DIRECTIONS OF PIEZOELECTRIC FLAT PLATE

EACH ARROW SHOWS DIRECTION OF POLARIZATION

C CROSS SECTION

EACH ARROW SHOWS DIRECTION OF DISPLACEMENT

THICKNESS DIRECTIONS OF PIEZOELECTRIC FLAT PLATE

EACH ARROW SHOWS DIRECTION OF POLARIZATION

B SURFACE

C SURFACE

ELECTRIC FIELD APPLYING DIRECTION

EACH ARROW SHOWS DIRECTION OF POLARIZATION

EACH ARROW SHOWS DIRECTION OF POLARIZATION

EACH ARROW SHOWS
DIRECTION OF POLARIZATION

MAGNETIC DISK APPARATUS

This is a continuation of parent application Ser. No. 09/368,570, filed Aug. 5, 1999 now abandoned.

BACKGROUND OF THE INVENTION

The invention relates to a magnetic disk apparatus and, more particularly, to a mechanism.structure for precisely positioning a head to write and read information to a predetermined position over a magnetic disk on which information is stored.

Hitherto, a voice coil motor has been used as an actuator to move a magnetic head to a desired position over a disk. According to this method, however, there is a limitation to improve a positioning precision. As a method of performing a positioning operation of a higher precision, therefore, a construction such that a second actuator to finely adjust the position of the magnetic head is arranged between the voice coil motor and the magnetic head has been proposed.

For example, according to a structure of a second actuator disclosed in JP-A-9-73746, total four piezoelectric elements are adhered to the surface of an elastic member to support a magnetic head, namely, two piezoelectric elements are adhered onto the upper surface of the elastic member, two piezoelectric elements are adhered onto the lower surface of the elastic member, and by applying a voltage to the piezoelectric element, the element is contracted and extended, thereby finely adjusting the position of the magnetic head.

SUMMARY OF THE INVENTION

The second actuator in the foregoing conventional technique has two problems which will be explained hereinbelow.

The first is a problem of a leakage displacement which simultaneously occurs in the direction perpendicular to the actuator surface when the second actuator is deformed in the positioning direction of the magnetic head. The leakage displacement is caused due to a difference between distortions of the elastic member and a piezoelectric flat plate. Since the leakage displacement causes a gap between the magnetic head and the magnetic disk to be changed, a reading sensitivity or writing sensitivity in a magnetic disk apparatus is fluctuated. In the worst case, a collision of the magnetic head and the magnetic disk is also caused.

The second is a problem regarding the productivity such that four piezoelectric flat plates are adhered to the elastic member for supporting the magnetic head. According to the adhering operation, particularly, in case of fine parts having a size of millimeter, the productivity is low and it is very difficult to specify the position where they are adhered with high precision.

In consideration of those technical problems, it is an object of the invention to provide a second actuator in which a leakage displacement in a direction other than the positioning direction is small and a productivity is high, thereby providing a magnetic disk apparatus which can inexpensively realize a high recording density.

To accomplish the above object, according to the invention, there is provided (1) a magnetic disk apparatus comprising: a magnetic head for writing and reading information; a magnetic disk on which information is stored; an elastic member for supporting the head; a fixed member for supporting the elastic member; a first actuator for coarse movement for moving the magnetic head to a predetermined position over the magnetic disk; and a second actuator for fine movement arranged between the first actuator and the magnetic head,
wherein the second actuator is a plate-shaped structure constructed by one or a plurality of laminated piezoelectric flat plates having electrodes on an upper surface and a lower surface and having therein two or more polarization regions and is arranged in a manner such that both upper surfaces or both lower surfaces of the fixed member and the elastic member are bridged by using the upper surface or lower surface of the second actuator as a plate-shaped structure.

(2) The second actuator is a plate-shaped structure constructed by one or a plurality of laminated piezoelectric flat plates each of which is made of a material having piezoelectric performance and has electrodes on an upper surface and a lower surface and is constructed in a manner such that the electrode of at least one of the upper and lower surfaces in the electrodes formed thereon is separated into two or more electrodes, the piezoelectric flat plate has therein a region which is not polarized and two or more polarization regions which are separated by a part of the non-polarized region and polarized in the thickness direction of the piezoelectric flat plate, and by applying an electric field to the two or more polarization regions in the piezoelectric flat plate in the thickness direction of the piezoelectric flat plate by using the electrodes formed on the upper and lower surfaces of the piezoelectric flat plate, the piezoelectric flat plate is deformed in the in-plane direction of the piezoelectric flat plate.

DESCRIPTION OF THE EMBODIMENTS

Embodiments of the present invention will now be described hereinbelow with reference to the drawings.

Figure 1:
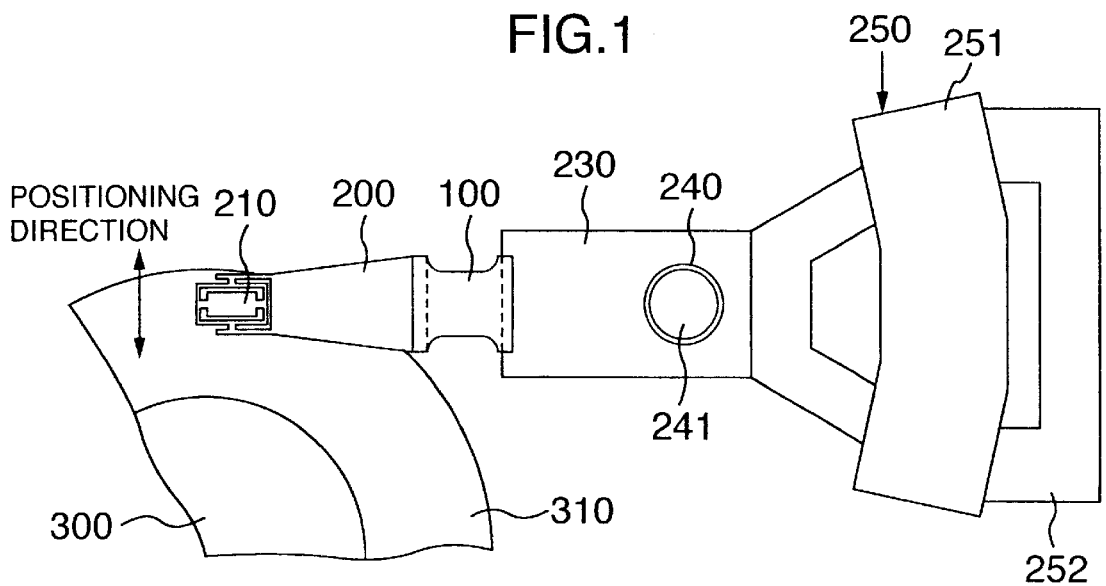
FIG. 1 is a top view showing a structure of a magnetic disk apparatus according to the first embodiment of the invention.

FIG. 1 is a top view showing a structure of a magnetic disk apparatus according to the first embodiment of the invention.

In the embodiment, a magnetic recording disk 310 in which a magnetic film is formed on the surface and information is stored and a spindle motor 300 to rotate the magnetic recording disk 310 are provided. Further, a magnetic head (not shown) comprising an electromagnetic transducing element to read and write information from/to the magnetic recording disk 310 is provided. Sliders (not shown) to float the magnetic head over the magnetic disk at a fixed flying height or distance therefrom are provided. The sliders are provided for a gimbals 210 to passively correct the position for the magnetic disk. The gimbals 210 is connected to one end side of a suspension 200 as an elastic member for elastically supporting the magnetic head and the slider. The other end side of the suspension 200 is coupled with a suspension supporting member 230 as a fixed member.

A first actuator is provided for the suspension supporting member 230 in order to move the magnetic head to a predetermined position over the magnetic disk and coarsely position it. The first actuator comprises: a voice coil motor 250; a magnet 251 constructing the voice coil motor; a coil 252; a suspension supporting member rotary shaft 241 serving as a rotational center when the magnetic head is positioned by the voice coil motor; and a bearing 240. A second actuator 100 for fine movement is provided between the voice coil motor and the magnetic head in order to position the magnetic head with high precision.

Figure 2A:
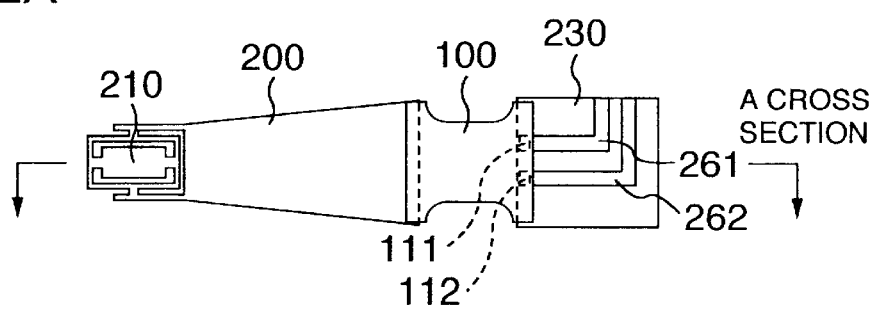
FIGS. 2A, 2B, and 2C are a top view and a cross sectional view showing a whole magnetic head supporting mechanism which is used in the magnetic disk apparatus of the invention and a top view showing a whole standard magnetic head supporting mechanism, respectively.
Figure 2B:
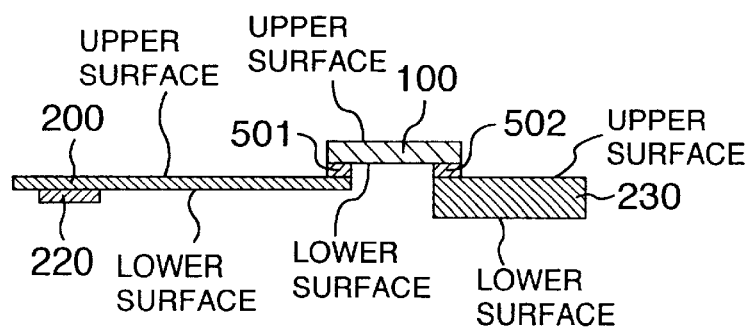

FIG. 2A is a top view showing further in detail a whole magnetic head supporting mechanism in a range from the suspension supporting member 230 to the magnetic head in the first embodiment of the invention. FIG. 2B is a cross sectional view taken along the line A—A in the whole magnetic head supporting mechanism shown in FIG. 2A.

Figure 2C:
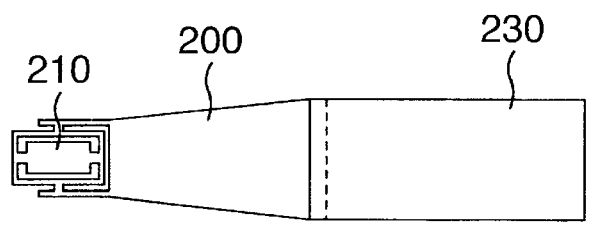

FIG. 2C is a top view showing a whole standard magnetic head supporting mechanism which does not have the second actuator for the purpose of reference.

The second actuator 100 has a plate-shaped structure in which piezoelectric flat plates are laminated, which will be explained hereinlater. In the embodiment, the second actuator is arranged so as to bridge the upper surfaces of the suspension supporting member 230 and suspension 200 by using the lower surface of the second actuator 100. The lower surface of the second actuator 100 and the upper surface of the suspension 200 are fixed by an adhesive agent layer 501. Similarly, the lower surface of the second actuator 100 and the upper surface of the suspension supporting member 230 are fixed by an adhesive agent layer 502. In the embodiment, as adhesive agent of the epoxy system is used for adhesion. In the specification, the side where a slider 220 is fixed to the suspension 200 is defined as a lower surface and its opposite side is defined as an upper surface. Connecting electrodes 111 and 112 for supplying an electric power to the second actuator are formed on the lower surface of the second actuator 100. The electrodes 111 and 112 are electrically connected by using a solder to leading electrodes 261 and 262 formed on the upper surface of the suspension supporting member 230, respectively. The connection by soldering also contributes to a mechanical connection between the second actuator and a suspension holding arm.

In the magnetic head supporting mechanism which does not have the second actuator, as shown in FIG. 2C, the suspension 200 is directly coupled to the suspension supporting member 230.

Figure 3A:
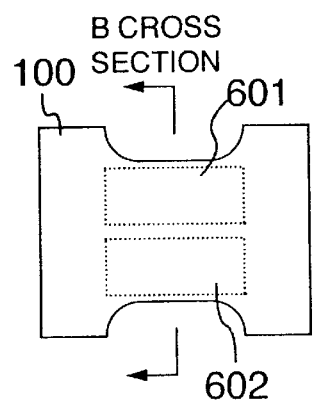
FIGS. 3A and 3B are a top view and a cross sectional view showing a structure of a second actuator of the first embodiment, respectively.
Figure 3B:
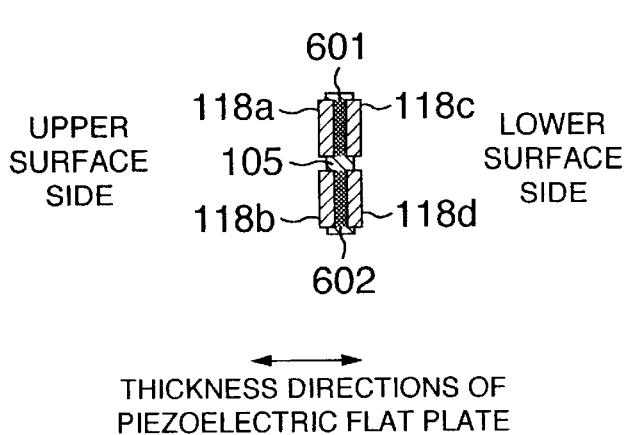

FIG. 3A is a top view showing a detailed structure of the second actuator 100 which is used in the embodiment. FIG. 3B is a cross sectional view taken along the line B—B in the second actuator shown in FIG. 3A.

The second actuator of the embodiment is a piezoelectric flat plate 105 of a plate-shaped structure made of a material having piezoelectric performance. The piezoelectric flat plate 105 has two electrodes 118a and 118b on the upper surface and two electrodes 118c and 118d on the lower surface. In the diagram, the left side in FIG. 3B in the thickness direction of the piezoelectric flat plate is defined as an upper surface side and the right side is defined as a lower surface side. The piezoelectric flat plate 105 has a polarized region 601 in a region sandwiched by the electrodes 118a and 118c and a polarized region 602 in a region sandwiched by the electrodes 118b and 118d. That is, two polarization regions are provided in one piezoelectric flat plate.

As mentioned above, the second actuator of the embodiment is a plate-shaped structure comprising the piezoelectric flat plate 105 having the electrodes on the upper and lower surfaces and having two polarization regions therein.

The operation of the second actuator of the embodiment will now be described.

Figure 4:
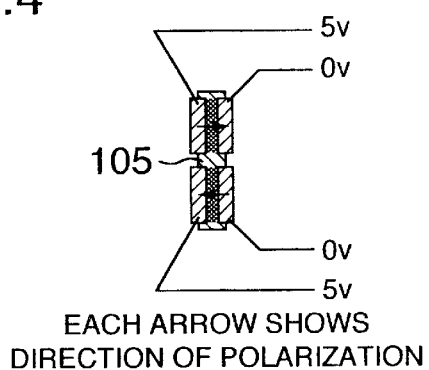
FIG. 4 is a cross sectional view showing a polarization region of the second actuator of the first embodiment.

FIG. 4 is a cross sectional view showing the direction of each polarization in the piezoelectric flat plate constructing the second actuator and an example of a state of an electric field when the actuator is driven.

The directions of the polarization in the two polarization regions of the piezoelectric flat plate 105 are thickness directions of the piezoelectric flat plate and are mutually opposite directions. An electric field is applied to the piezoelectric flat plate in such a polarizing state as shown in FIG. 4. That is, the electric field is applied to the polarization region 601 so that the direction of the polarization and that of the electric field are the same. The electric field is applied to the polarization region 602 so that the direction of the polarization and that of the electric field are opposite.

Figure 5A:
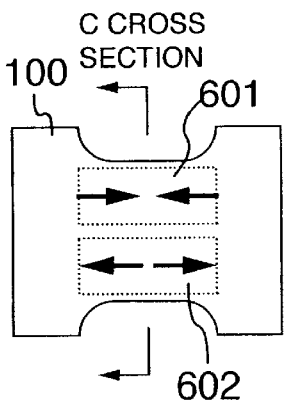
FIGS. 5A and 5B are a top view and a cross sectional view showing a displacement of the second actuator of the first embodiment, respectively.
Figure 5B:
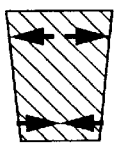

FIG. 5A is a top view showing a state of displacement in the plane (positioning direction) of the second actuator 100 when such an electric field is applied. FIG. 5B is a C cross sectional view showing a displacement in the thickness directions (directions perpendicular to the upper surface of the actuator) of the second actuator shown in FIG. 5A.

The polarization region 601 deforms so as to be contracted in the in-plane direction and extended in the thickness directions because the direction of the polarization and that of the electric field are the same. On the other hand, the polarization region 602 deforms so as to be extended in the in-plane direction and contracted in the thickness directions because the direction of the polarization and that of the electric field are opposite. Therefore, by applying the foregoing electric field to the second actuator, the suspension 200 fixed to the second actuator 100 can be deformed in the plane (in the positioning direction) for the suspension supporting member 230. By changing an intensity and the direction of the electric field which is applied, the magnetic head fixed to the head of the suspension 200 can be finely moved in the positioning direction with high precision. In this instance, the second actuator 100 is also deformed in the thickness directions of the actuator as shown in FIG. 5B.

In the embodiment, the second actuator is arranged so as to bridge the upper surfaces of the suspension 200 and suspension supporting member 230 and its effect will now be described.

First, problems in the conventional arranging method will be described with reference to FIGS. 6A and 6B.

Figure 6A:
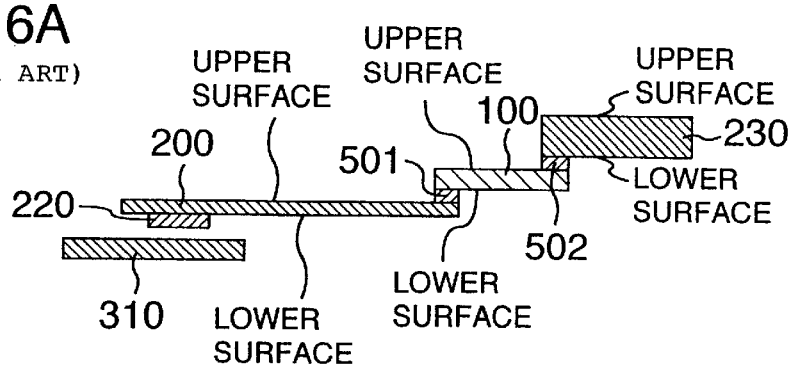
FIGS. 6A and 6B are a cross sectional view and a side elevational view showing a displacement of a magnetic head supporting mechanism in which a conventional second actuator is arranged, respectively.

FIG. 6A relates to a conventional layout structure and shows a cross sectional view of a whole magnetic head supporting mechanism in the case where the second actuator 100 is arranged so as to be sandwiched between the upper surface of the suspension 200 and the lower surface of the suspension supporting member 230. An adhesive agent is used to fix the actuator. FIG. 6B is a side elevational view when the magnetic head supporting mechanism of FIG. 6A is seen from the left side of the diagram.

Figure 6B:
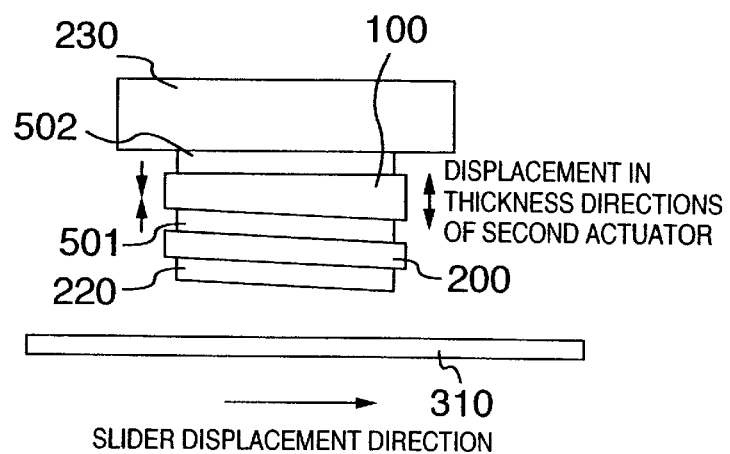

In this case, the second actuator is made operative, thereby deforming the slider 220, for example, to the right as shown in FIG. 6B. Thus, the right side of the second actuator 100 is deformed so as to be extended in the thickness directions and the left side is deformed so as to be contracted in the thickness directions as shown in FIG. 6B. At this time, since the suspension 200 is fixed to the upper surface of the second actuator and the suspension supporting member 230 is fixed to the lower surface of the second actuator, respectively, the displacement in the thickness directions causes a displacement in the vertical direction of the suspension for the suspension supporting member. For example, in the case shown in FIG. 6B, the right side of the suspension 200 is inclined downwardly.

Therefore, when the second actuator is made operative and the magnetic head is positioned to a predetermined position over the magnetic disk, a gap between the slider 220 and magnetic disk 310 is changed. Therefore, the stable reading and writing of the magnetic head cannot be realized.

Figure 7A:
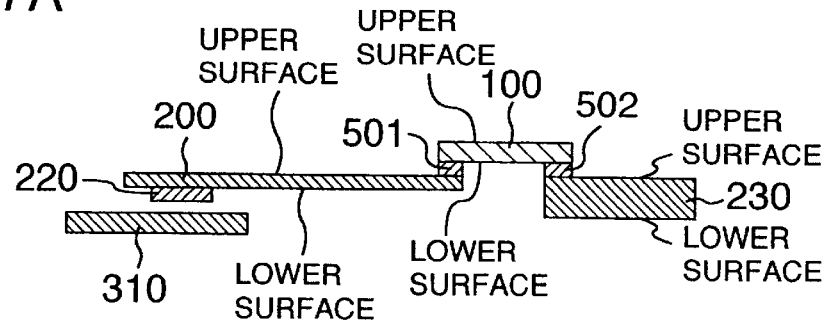
FIGS. 7A and 7B are a cross sectional view and a side elevational view showing a displacement of a magnetic head supporting mechanism in which the second actuator of the first embodiment is arranged, respectively.
Figure 7B:
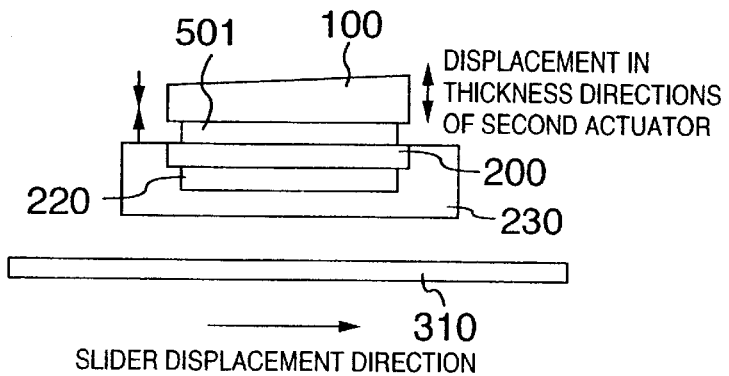

The case of the embodiment will now be described with reference to FIGS. 7A and 7B. FIG. 7A shows a cross sectional view of the whole magnetic head supporting mechanism in the case where the second actuator 100 is arranged so as to bridge the upper surface of the suspension 200 and the upper surface of the suspension supporting member 230. An adhesive agent is used to fix the actuator. FIG. 7B is a side elevational view when the magnetic head supporting mechanism is seen from the left side of the diagram.

In the case of the embodiment, when the second actuator is made operative and, for example, the slider 220 is deformed to the right side of FIG. 7B, the right side of the second actuator 100 is deformed so as to be extended in the thickness directions and the left side is deformed so as to be contracted in the thickness directions as shown in FIG. 7B. In this instance, the suspension 200 and suspension supporting member 230 are fixed to the lower surface side serving as the same surface side of the second actuator 100. Thus, the displacement in the thickness directions does not cause a displacement in the vertical direction of the suspension for the suspension supporting member. Therefore, even when the second actuator is made operative and the magnetic head is positioned to a predetermined location over the magnetic disk 310, a gap between the slider 220 and the magnetic disk is not changed. Consequently, the stable reading and writing operations of the magnetic head can be realized.

As mentioned above, since the second actuator of the embodiment has a construction such that the piezoelectric film is a single layer and total two pairs of electrodes are provided for the upper surface side and lower surface side, the structure is simple, a variation among the elements is small, and it is suitable for mass production.

Figure 8A:
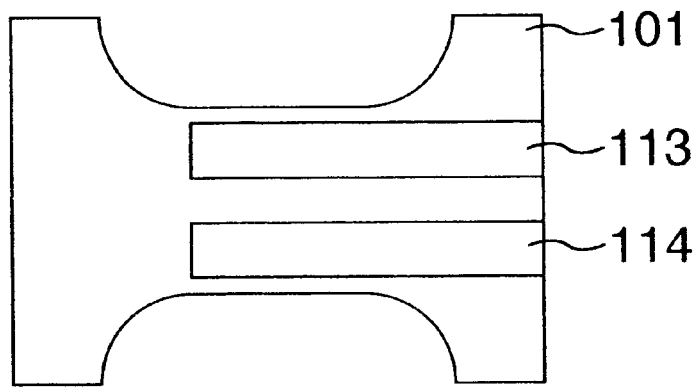
FIGS. 8A, 8B, and 8C are parts diagrams of a second actuator of the second embodiment, respectively.
Figure 8B:
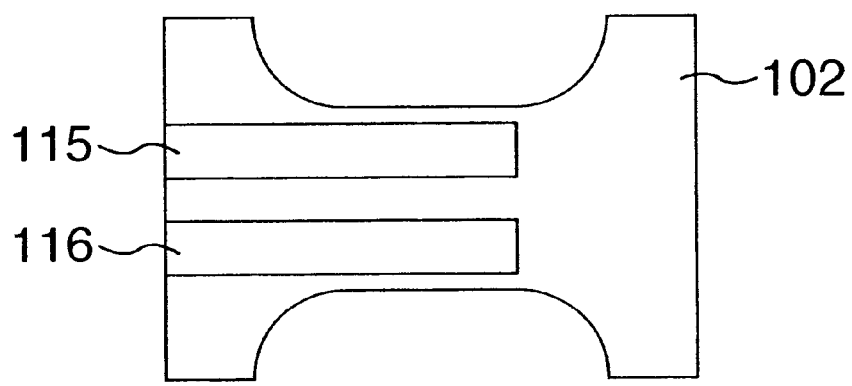
Figure 8C:
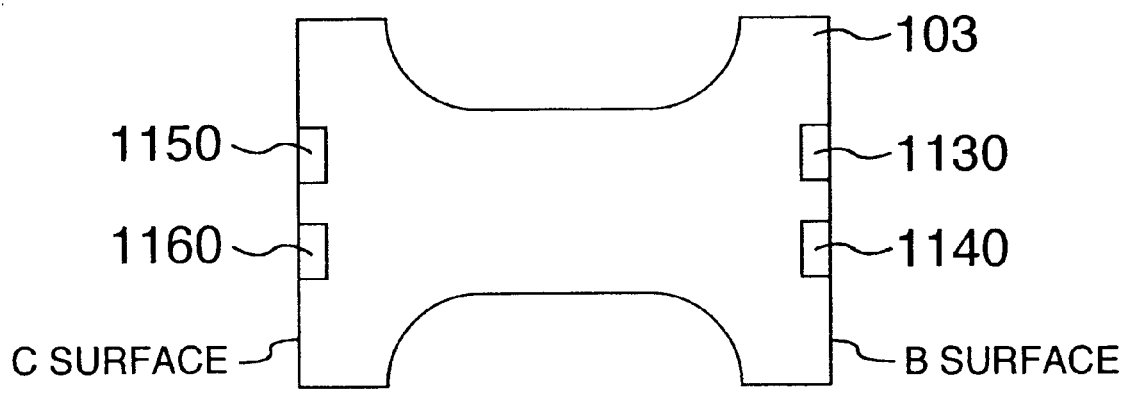

FIGS. 8A, 8B, and 8C are parts diagrams of the second actuator of the second embodiment of the invention.

The second actuator in the embodiment has a plate-shaped structure in which piezoelectric flat plates 101 and 102 made of a material having piezoelectric performance shown in FIGS. 8A and 8B are alternately laminated. As a piezoelectric material, an oxidized compound of lead zirconia titanium is used. Two separated electrodes 113 and 114 made of silver palladium are formed on the upper surface of the piezoelectric flat plate 101 shown in FIG. 8A. Similarly, two separated electrodes 115 and 116 made of silver palladium are formed on the upper surface of the piezoelectric flat plate 102 shown in FIG. 8B. In FIGS. 8A and 8B, the positions where the electrodes are formed are different as shown in the diagrams and the electrodes are formed so as to be come into contact with different sides. FIG. 8C shows a piezoelectric flat plate 103 which is arranged on the top surface of the second actuator formed by alternately laminating the piezoelectric flat plates 103 shown in FIGS. 8A and 8B. As shown in FIG. 8C, four electrodes 1130, 1140, 1150, and 1160 are formed on the piezoelectric flat plate 103 of the top layer so that they are come into contact with two opposite surfaces shown by a B surface and a C surface.

Figure 9:
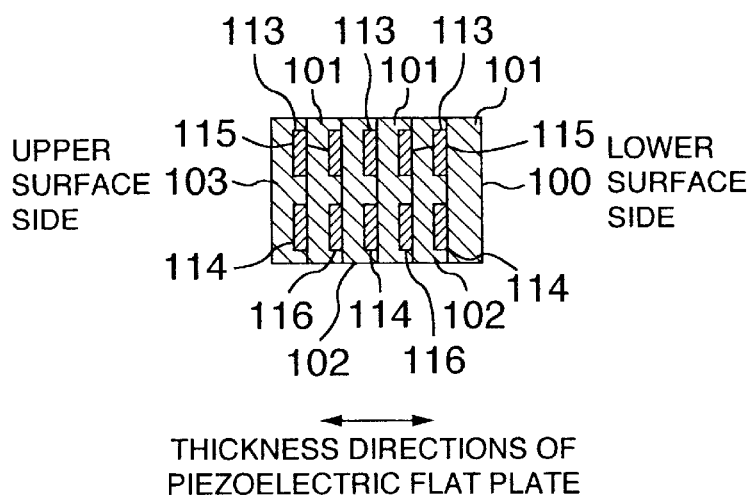
FIG. 9 is a cross sectional view of the second actuator of the second embodiment.

FIG. 9 shows a cross sectional view of the second actuator of the second embodiment.

As shown in the diagram, the second actuator is a plate-shaped structure in which three piezoelectric flat plates 101 and two piezoelectric flat plates 102 are alternately laminated and the piezoelectric flat plate 103 is laminated to the top layer. The two electrodes 113 and 114 are formed on the top surface of the piezoelectric flat plate 101. The two electrodes 115 and 116 are formed on the top surface of the piezoelectric flat plate 102. By alternately laminating those piezoelectric flat plates, the two electrodes 115 and 116 on the upper surface of the piezoelectric flat plate 102 which is arranged on the lower surface of the piezoelectric flat plate 101 are shared as electrodes on the lower surface of the piezoelectric flat plate 101. Similarly, the two electrodes 113 and 114 on the upper surface of the piezoelectric flat plate 101 which is arranged on the lower surface of the piezoelectric flat plate 102 are shared as electrodes on the lower surface of the piezoelectric flat plate 102.

Therefore, the second actuator of the embodiment is a plate-shaped structure in which four piezoelectric flat plates having the electrodes on the upper and lower surfaces are laminated and all of the electrodes existing on each of the upper and lower surfaces of the piezoelectric flat plate are separated to two electrodes. In the second actuator of the embodiment, although the piezoelectric flat plate 103 is arranged in the top layer and the piezoelectric flat plate 101 is arranged in the bottom layer, since they are used for protection of the internal electrodes or connection of the internal electrodes, they can be omitted.

Figure 10A:
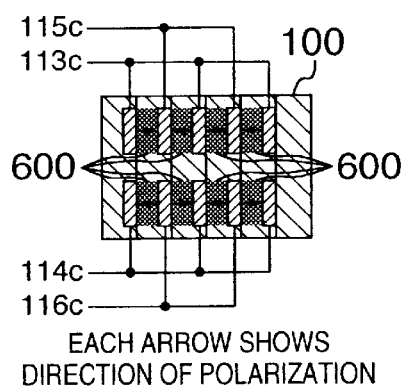
FIGS. 10A and 10B are a cross sectional view and a top view showing a polarization region of the second actuator of the second embodiment, respectively.
Figure 10B:
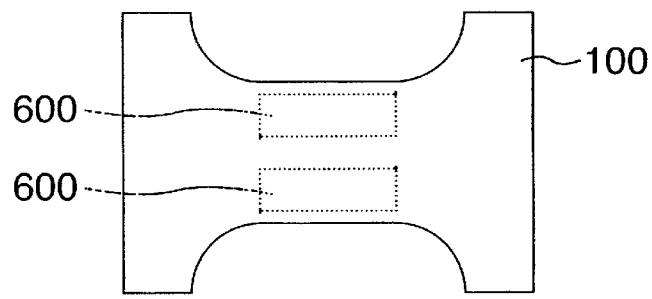

FIG. 10A is a cross sectional view showing polarizing states in the four piezoelectric flat plates each of which constructs the second actuator of the second embodiment and has the electrodes on the upper and lower surfaces and showing a connecting state of each electrode. FIG. 10B is a top view of FIG. 10A.

In all of the four piezoelectric flat plates each having the electrodes on the upper and lower surfaces mentioned above, two separated polarization regions 600 exist in a region sandwiched by the electrodes existing on the upper and lower surfaces. For example, on the piezoelectric flat plate 101, mutually separated polarization regions exist in the region sandwiched by the upper surface electrode 113 and lower surface electrode 115 and the region sandwiched by the upper surface electrode 114 and lower surface electrode 116. On the piezoelectric flat plate 102, mutually separated polarization regions exist in the region sandwiched by the upper surface electrode 115 and lower surface electrode 113 and the region sandwiched by the upper surface electrode 116 and lower surface electrode 114. A part of the regions which is not polarized in the piezoelectric flat plate exists between the separated polarization regions, and the foregoing polarization regions are separated into two regions by such a non-polarized region in the piezoelectric flat plate. All of the directions of the polarization in the polarization regions are the thickness directions of the piezoelectric flat plate. In the second actuator of the embodiment, the two polarization regions in the same piezoelectric flat plate have the opposite polarizing directions. A state where the polarization regions are separated by a part of the non-polarized region in the piezoelectric flat plate is as shown in FIG. 10B when they are seen from the top.

As for the electrodes 113, 114, 115, and 116 constructing the second actuator in the embodiment, as shown in FIGS. 10A and 10B, the electrodes 113 are mutually connected and integrated to an electrode 113c, the electrodes 114 are mutually connected and integrated to an electrode 114c, the electrodes 115 are mutually connected and integrated to an electrode 115c, and the electrodes 116 are mutually connected and integrated to an electrode 116c, respectively.

Figure 11A:
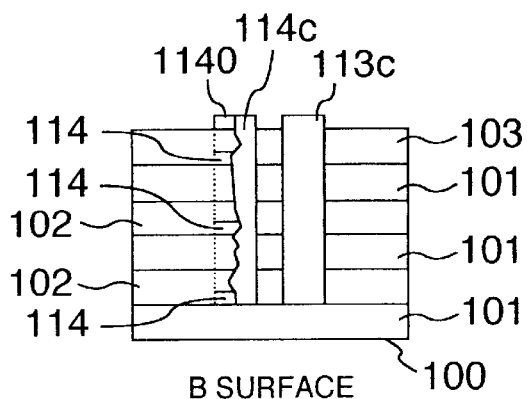
FIGS. 11A and 11B are side elevational views of the second actuator of the second embodiment, respectively.
Figure 11B:
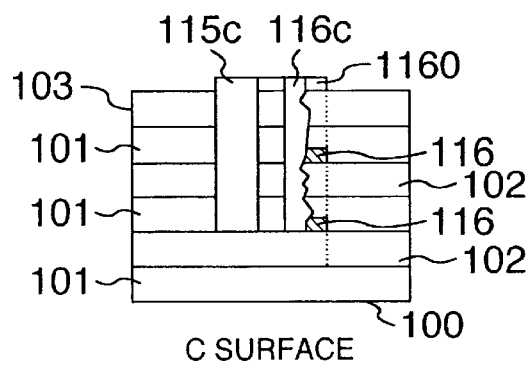

FIGS. 11A and 11B are side elevational views of a second actuator of the second embodiment showing structures to specifically realize the connection of the electrodes mentioned above, respectively.

FIG. 11A shows the side elevational view on the B surface side shown in FIG. 8C and FIG. 11B shows the side elevational view on the C surface side shown in FIG. 8C, respectively. The electrodes on each piezoelectric flat plate are as shown in FIGS. 8A, 8B, and 8C.

The electrodes 113 formed on each layer are connected by the electrode 113c and connected to the electrode 1130 (not shown) formed on the piezoelectric flat plate 103 of the top layer. Likewise, the electrodes 114 formed on each layer are connected by the electrode 114c and connected to the electrode 1140 formed on the piezoelectric flat plate 103 of the top layer. Similarly, the electrodes 115 formed on each layer are connected by the electrode 115c and connected to the electrode 1150 (not shown) formed on the piezoelectric flat plate 103 of the top layer. Likewise, the electrodes 116 formed on each layer are further connected by the electrode 116c and connected to the electrode 1160 formed on the piezoelectric flat plate 103 of the top layer.

The operation of the second actuator of the second embodiment will now be described.

Figure 12A:
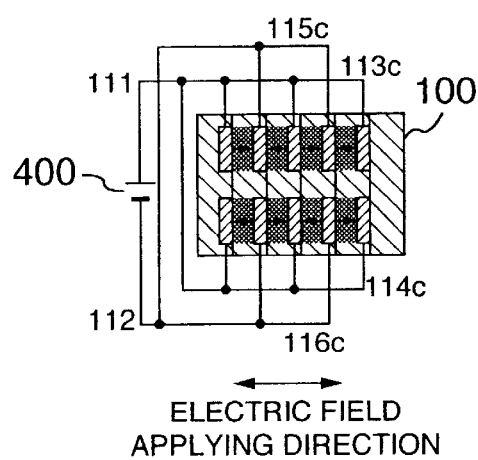
FIGS. 12A and 12B are a cross sectional view and a top view showing an electrode structure of the second actuator of the second embodiment, respectively.
Figure 12B:
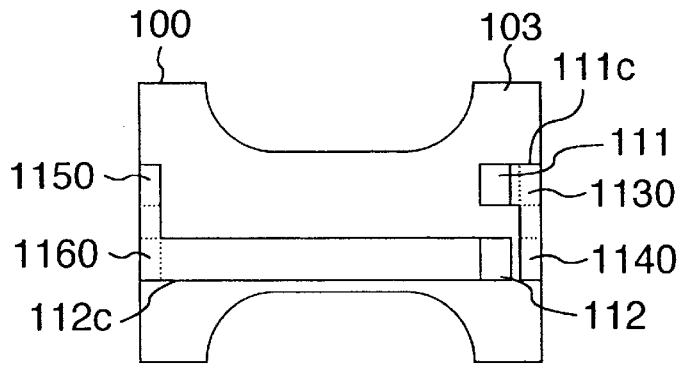

FIG. 12A is a cross sectional view showing the directions of polarization in the piezoelectric flat plate constructing the second actuator and an example of a state of an electric field when the actuator is driven. FIG. 12B is a top view showing a connecting structure of the electrodes 1130, 1140, 1150, and 1160 to realize the foregoing driving and a structure of the connecting electrodes 111 and 112 to connect the leading electrodes on the suspension supporting member and the electrodes of the second actuators.

In the second actuator, all of the directions of the polarization in the two polarization regions in the four piezoelectric flat plates are the thickness directions of the piezoelectric flat plate as already mentioned above. Further, they are the opposite directions. For example, as shown in FIG. 12A, an electric field is applied to the piezoelectric flat plates in such a polarizing state in the thickness directions of the piezoelectric flat plates. In case of the embodiment, an electric field is applied to the polarization region sandwiched by the electrodes 113 and 115 so that the direction of the polarization and that of the electric field are the same, and an electric field is applied to the polarization region sandwiched by the electrodes 114 and 116 so that the direction of the polarization and that of the electric field are opposite. Specifically speaking, the electrodes 113c and 114c are connected and connected to the high voltage side of a power source 400, and the electrodes 115c and 116c are connected and connected to the low voltage side of the power source 400.

A specific connecting structure of the electrodes is as shown in FIG. 12B. On the piezoelectric flat plate 103 as a top layer of the second actuator, the electrode 1130 connected to the electrode 113c and the electrode 1140 connected to the electrode 114c are connected by an electrode 111c, the electrode 1150 connected to the electrode 115c and the electrode 1160 connected to the electrode 116c are connected by an electrode 112c, further, the electrode 111c is connected to the connecting electrode 111, and an electrode 112c is connected to the connecting electrode 112. The connecting electrodes 111 and 112 are connected to the leading electrodes 261 and 262 on the suspension supporting member 230 by soldering. An electric field is applied to the second actuator through the leading electrodes.

Figure 13:
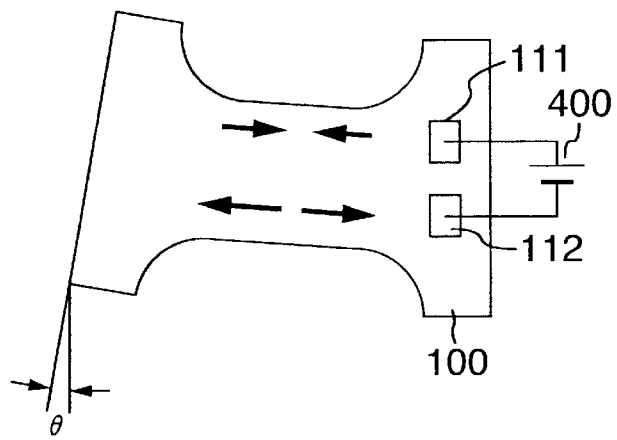
FIG. 13 is a top view showing a displacement of the second actuator of the second embodiment.

FIG. 13 is a top view showing a state of displacement in the plane when the electric field is applied to the second actuator of the second embodiment.

When a high voltage side of the power source 400 is connected to the connecting electrode 111 and a low voltage side of the power source 400 is connected to the connecting electrode 112, the connecting electrode 111 side is contracted in the plane because the direction of the polarization in the polarization region and that of the electric field to be applied are the same, while the connecting electrode 112 side is extended in the plane because the direction of the polarization and that of the electric field to be applied are opposite. Therefore, the second actuator is deformed in the plane as shown in the diagram thereby causing the suspension fixed to the second actuator to be deformed by an angle 2 for the suspension supporting member. By controlling a displacement amount or a displacement direction by changing a magnitude and a direction of the electric field to be applied, the magnetic head fixed to the tip of the suspension 200 can be finely moved to a predetermined positioning location with high precision.

According to the magnetic disk apparatus of the embodiment, since it is sufficient to fix the second actuator to a gap between the suspension and the suspension supporting member, the magnetic disk apparatus of high productivity can be obtained. Obviously, by arranging the second actuator as shown in the first embodiment, the magnetic disk apparatus in which not only the reliability is high but also the stable reading and writing operations of the magnetic head are performed can be realized. In the embodiment, since a thickness of piezoelectric flat plate per layer can be made thin by laminating the piezoelectric flat plates, the intensity of the electric field which is applied to the piezoelectric flat plate (the voltage which is applied to the second actuator/the thickness of piezoelectric flat plate) can be increased. Since the displacement of the second actuator is proportional to the intensity of the electric field, a large displacement can be obtained by a low voltage.

Figure 14:
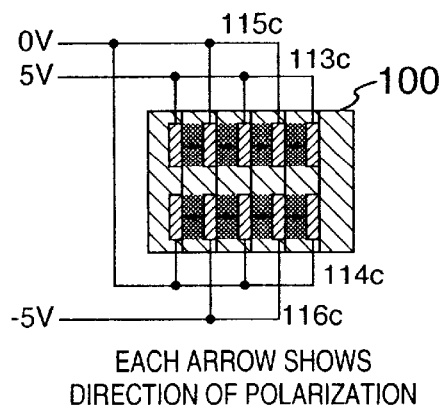
FIG. 14 is a cross sectional view showing a structure of a second actuator of the third embodiment.

FIG. 14 is a cross sectional view showing a structure of the second actuator of the third embodiment of the invention.

A structure of piezoelectric flat plates, a structure of polarization regions, and the direction of polarization in each polarization region are substantially the same as those of the second actuator described in the second embodiment. In the embodiment, a connecting method of the electrodes and an applying state of the electric field are different from those of the second embodiment. That is, the electrodes 115c and 114c are connected to the ground, the electrode 113c is connected to +5V, and the electrode 116c is connected to −5V. All of the electric fields to be applied are applied in the thickness directions of the piezoelectric flat plate. The direction of the polarization and that of the electric field are the same on the side of the electrodes 113 and 115. The direction of the polarization and that of the electric field are opposite on the side of the electrodes 114 and 116. In this case, an in-plane displacement similar to that of the second actuator of the second embodiment shown in FIG. 13 occurs. By fixing the ground and changing the electric fields to be applied to the electrodes 113c and 116c, the magnetic head can be finely moved to a predetermined position with high precision.

In case of the embodiment, a driving circuit can be simplified more than that in the second embodiment.

Figure 15:
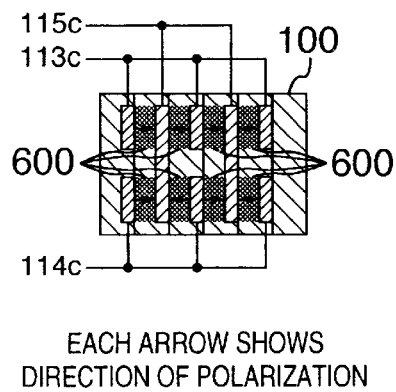
FIG. 15 is a cross sectional view showing a structure of a second actuator of the fourth embodiment.

FIG. 15 is a cross sectional view showing a structure of a second actuator constructing a magnetic disk apparatus as a fourth embodiment of the invention.

In the embodiment, a piezoelectric flat plate having two electrodes on the upper surface and one electrode on the lower surface and a piezoelectric flat plate having one electrode on the upper surface and two electrodes on the lower surface are alternately laminated. The electrodes on the surfaces to be come into contact with each other are shared by two piezoelectric flat plates which are come into contact with each other. As a polarization region, a region sandwiched by the upper surface electrode and the lower surface electrode becomes the polarization region 600 in a manner similar to the case of the second embodiment. Since either the upper surface or the lower surface is certainly separated into two electrodes, the polarization region in the piezoelectric flat plate is also separated into two regions. This structure can be considered just as a structure such that the electrodes 115 and 116 in the second embodiment are previously connected. The two polarization regions in the piezoelectric flat plate have a structure such that they are separated by a part of the non-polarized region in the piezoelectric flat plate in a manner similar to the case of the second embodiment. The directions of polarization are the thickness directions of the piezoelectric flat plate. The directions of polarization in the two polarization regions in the piezoelectric flat plate are the same. As shown in FIG. 15, the electrodes are connected in a manner such that one of each electrode separated into the two electrodes is collectively connected to the electrode 113c, the other electrode of each separated electrode is collectively connected to the electrode 114c, and all of the single-electrodes are collectively connected to the electrode 115c.

Figure 16A:
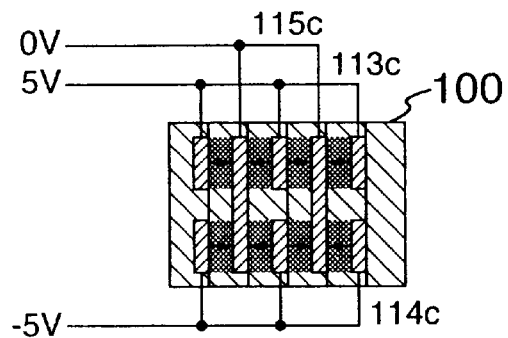
FIGS. 16A and 16B are cross sectional views showing an applying method of an electric field of the second actuator of the fourth embodiment, respectively.

FIG. 16A is a cross sectional view showing an example of an applying method of the electric field in the embodiment.

The electrode 115c is connected to the ground, the electrode 113c is connected to +5V, and the electrode 114c is connected to −5V. All of the directions of the electric fields are the thickness directions of the piezoelectric flat plates. In one polarization region in the piezoelectric flat plate, the direction of the polarization and that of the electric field are the same. In the other polarization region in the piezoelectric flat plate, the direction of the polarization and that of the electric field are opposite. In this case as well, the second actuator causes an in-plane displacement similar to that of the second actuator of the second embodiment shown in FIG. 13. By fixing the ground and changing the electric fields which are applied to the electrodes 113c and 114c, the magnetic head fixed to the tip of the suspension 200 can be finely moved in the positioning direction with high precision.

As compared with the second embodiment, according to the case of the present embodiment, since the number of electrodes even on one side can be reduced into the half, a process of forming the electrodes is simplified. Particularly, since one electrode is formed on the back side, it is sufficient to form the electrode on the whole surface and there is no need to form a pattern.

Figure 16B:
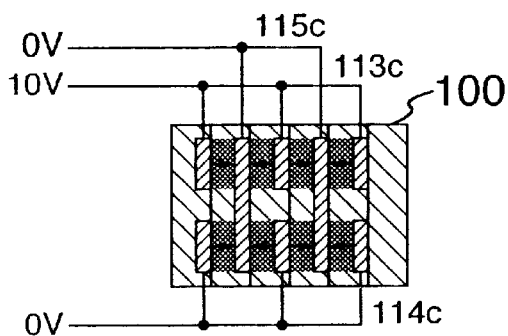

FIG. 16B is also a cross sectional view showing an example of an applying method of an electric field in the embodiment.

The electrode 115c is connected to the ground, the electrode 113c is connected to +10V, and the electrode 114c is connected to 0V. All of the directions of the electric fields are the thickness directions of the piezoelectric flat plates. In the polarization region in the piezoelectric flat plate, the direction of the polarization and that of the electric field are always the same. In this case as well, the second actuator causes an in-plane displacement similar to that of the second actuator of the second embodiment shown in FIG. 13. By fixing the ground and changing the electric fields which are applied to the electrodes 113c and 114c, the magnetic head fixed to the tip of the suspension 200 can be finely moved in the positioning direction with high precision.

The electric field applying method corresponds to that a bias of 5V is applied in the applying method of FIG. 16A and the direction of the polarization in the polarization region and that of the electric field to be applied are always the same, there is no polarization deterioration of the piezoelectric flat plate. In addition to the effects of the second embodiment, a magnetic disk apparatus having the higher reliability can be realized.

Figure 17:
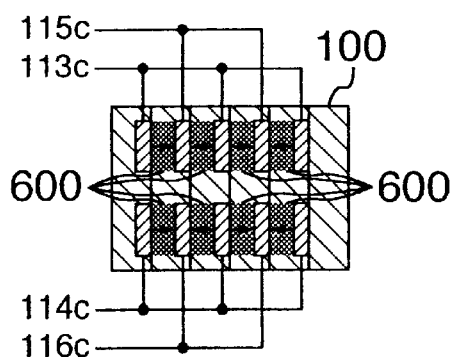
FIG. 17 is a cross sectional view showing a structure of a second actuator of the fifth embodiment.

FIG. 17 is a cross sectional view showing a structure of a second actuator of the fifth embodiment of the invention.

Although a structure of piezoelectric flat plates and a structure of the polarization regions 600 are substantially the same as those in the second embodiment, the directions of polarization in each polarization region differ from those in the second embodiment and the directions of polarization in the two polarization regions in the piezoelectric flat plate are the same. In the embodiment, a connecting method of the electrodes is substantially the same as that in the second embodiment. That is, the electrodes 115 are integrated to the electrode 115c, the electrodes 114 are integrated to the electrode 114c, the electrodes 115 are integrated to the electrode 115c, and the electrodes 116 are integrated to the electrode 116c, respectively.

Figure 18:
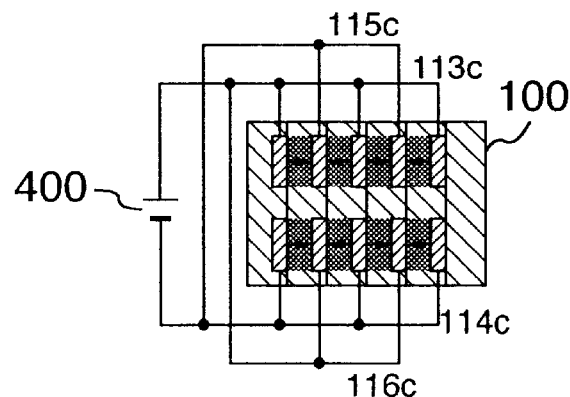
FIG. 18 is a cross sectional view showing the operation of the second actuator of the fifth embodiment.

FIG. 18 is a cross sectional view showing the operation of the second actuator of the present embodiment.

The electrodes 113c and 116c are connected, the electrodes 114c and 115c are connected to the high voltage side of the power source 400 and connected to the low voltage side of the power source 400, respectively. In this case as well, the second actuator causes an in-plane displacement in a manner similar to the case of the second embodiment described in FIG. 13. By changing the electric fields which are applied to the electrodes 113c and 114c, the magnetic head can be finely moved in the positioning direction with high precision.

Besides the same effects as those in the case of the second embodiment, the present embodiment has advantages such that the polarization is easy, there is no mutual interference in the non-polarized region between the two polarization regions, the polarization is stable, and the reliability is high.

Figure 19A:
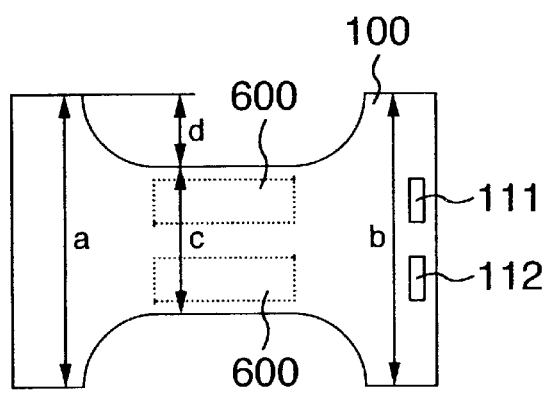
FIGS. 19A and 19B are a top view showing a structure of a second actuator of the sixth embodiment and a top view showing a structure of a second actuator for the purpose of comparison, respectively.
Figure 19B:
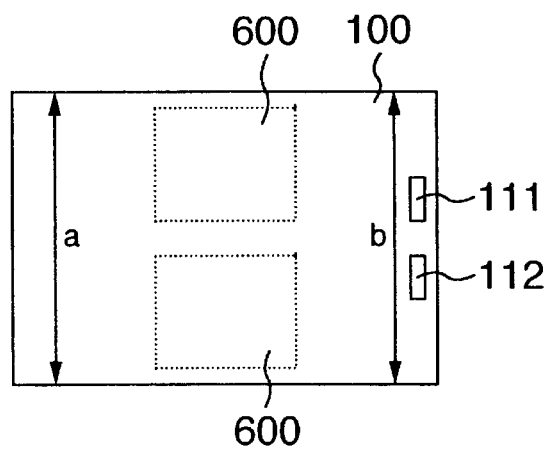

FIGS. 19A and 19B are top views showing a structure of a second actuator constructing a magnetic disk apparatus as a sixth embodiment of the invention.

FIG. 19A shows the top view of the second actuator of the embodiment. Notches or recesses (or cut-away) of a width (d) is formed on the piezoelectric flat plate so as to sandwich the polarization regions 600. Therefore, a width (c) of a portion where the polarization regions exist is narrower than a width (a) of a region where the second actuator and the suspension are adhered or a width (b) of a region where the second actuator and the suspension supporting member are adhered.

FIG. 19B shows the top view of the second actuator in which the notches as in the embodiment does not exist for the purpose of comparison.

Figure 20:
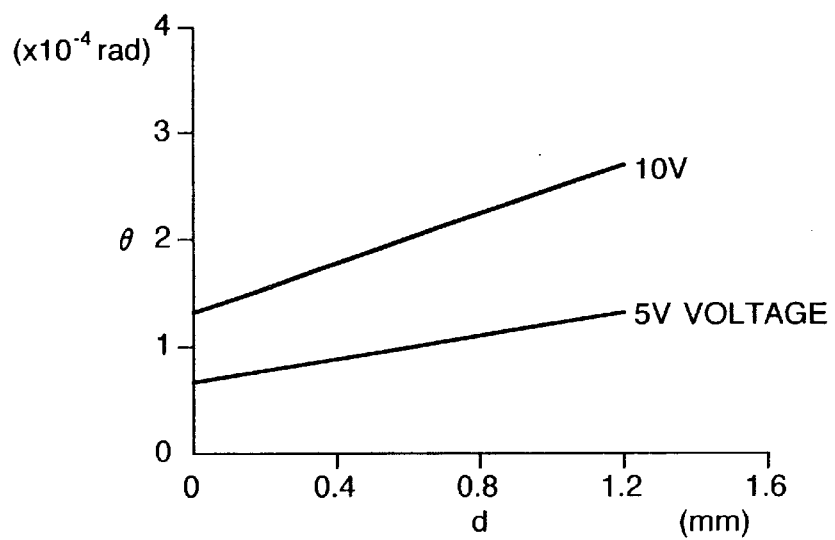
FIG. 20 is a graph of experimental results showing the operation of the second actuator of the sixth embodiment.

FIG. 20 is a graph showing experimental results showing effects peculiar to the embodiment.

An axis of abscissa denotes a length (d) of notch and an axis of ordinate indicates a displacement amount 2 (shown in FIG. 13) in the plane of the second actuator. FIG. 20 shows results in the case where trial models of the actuator described in the second embodiment were actually formed and the lengths of notches and the in-plane displacement amounts were measured. The measurement was performed by the driving voltages of 5V and 10V. Thus, it has been found that in case of the same driving voltage, the displacement of the actuator having the notch is larger than the actuator without a notch.

As mentioned above, there is an effect such that by forming the notch, a voltage that is necessary to cause a predetermined displacement can be reduced. However, if the length of notch is too long, since the strength of the second actuator decreases and the actuator is likely to be destroyed, it is necessary to optimize the actual notch amount together with the reliability.

In addition to the foregoing embodiments, many methods of applying the electric fields to the two polarization regions in the piezoelectric flat plate are considered. By applying different electric fields to the two polarization regions, a similar in-plane displacement can be caused in all of the piezoelectric flat plates.

Although there are the two polarization regions in the piezoelectric flat plate in the foregoing embodiments, three or more polarization regions can be formed.

In the foregoing embodiments, although the second actuator is arranged so as to bridge the upper surfaces of the suspension and the suspension supporting member, it can be arranged so as to bridge the lower surfaces.

In the foregoing embodiments, as a second actuator, one device as a piezoelectric flat plate is fixed so as to bridge the upper surfaces of the suspension and the suspension supporting member. However, two devices can be fixed so that the upper surfaces and the lower surfaces of the suspension and the suspension supporting member are bridged. In this case, one device is fixed so as to bridge the upper surfaces of the suspension and the suspension supporting member and the other one device is fixed so as to bridge the lower surfaces of the suspension and the suspension supporting member.

In the foregoing embodiments, although the second actuator has been arranged between the suspension and the suspension supporting member, it can be arranged in the suspension supporting member or in the suspension.

Although all of the foregoing embodiments relate to the magnetic disk apparatus, the invention can be applied to a magnetic disk array apparatus formed by laying out a plurality of magnetic disk apparatuses or can be applied to a storing device using a rotary recording medium other than the magnetic disk, for example, an optical disk apparatus, a magnetooptic recording apparatus, or the like.

According to the invention, since the apparatus can be driven by a low voltage and there is no displacement in the vertical direction for the upper surface of the actuator upon driving, it is possible to provide a magnetic disk apparatus in which the reliability of writing/reading of the magnetic head is high and the productivity is also high. Thus, a recording density of the rotary disk type information storing apparatus can be remarkably raised.

What is claimed is:

1. A magnetic disk apparatus comprising:
    a magnetic head for writing and reading information;
    a magnetic disk on which information is stored;
    an elastic member for supporting said magnetic head;
    a fixing member for supporting said elastic member;
    a first actuator for moving said magnetic head to a predetermined position over said magnetic disk; and
    a second actuator arranged between said first actuator and said magnetic head,
    wherein said second actuator is a plate-shaped structure constructed by at least one piezoelectric flat plate extending along said magnetic disk, said piezoelectric flat plate having a thickness and having electrodes on upper and lower surfaces, the electrode of at least one of the surfaces among the electrodes existing on said upper and lower surfaces of said piezoelectric flat plate is separated into two or more electrodes, said piezoelectric flat plate has therein a region which is not polarized and two or more polarization regions which are separated by a part of said non-polarized region and are polarized in a direction of thickness of said piezoelectric flat plate, and by applying electric fields in the thickness direction of said piezoelectric flat plate to said two or more polarization regions by using said electrodes existing on said upper and lower surfaces of said piezoelectric flat plate, said piezoelectric flat plate is deformed in an in-plane direction of said piezoelectric flat plate, said second actuator having one edge portion along one of said upper and lower surfaces thereof coupled to said fixing member, and an other edge portion along the one of said upper and lower surfaces thereof coupled to said elastic member and said piezoelectric flat plate having recesses formed thereon so as to sandwich the two or more polarization regions in said piezoelectric flat plate therebetween.

2. An apparatus according to claim 1, wherein directions of the polarization of the two or more polarization regions in said piezoelectric flat plate are opposite one another.

3. An apparatus according to claim 1, wherein said second actuator includes at least two of said piezoelectric flat plates in each of which the electrodes on one of either the upper or lower surfaces of said piezoelectric flat plate is a single electrode and the electrodes of an opposite surface to the single electrode is separated into two or more electrodes, said piezoelectric flat plates being laminated.

4. An apparatus according to claim 1, wherein said second actuator includes at least two of said piezoelectric flat plates, said piezoelectric flat plates being laminated.

5. A magnetic disk apparatus comprising:

a magnetic head for writing and reading information;

a magnetic, disk on which information is stored;

an elastic member for supporting said magnetic head;

a fixing member for supporting said elastic member;

a first actuator for coarse movement for moving said magnetic head to a predetermined position over said magnetic disk; and a second actuator for fine movement arranged between said first actuator and said magnetic head, wherein said second actuator is a plate-shaped structure extending along said magnetic disk which is made of a material having piezoelectric performance and formed by laminating two or more piezoelectric flat plates having a thickness, each of said two or more piezoelectric flat plates having electrodes on upper and lower surfaces, the electrode of at least one of the surfaces among the electrodes existing on said upper and lower surfaces in a piezoelectric flat plate is separated into two or more electrodes, said piezoelectric flat plate has therein a region which is not polarized and two or more polarization regions which are separated by a part of said non-polarized region and are polarized in the thickness direction of said piezoelectric flat plate, and by applying electric fields in the thickness direction of said piezoelectric flat plate to said two or more polarization regions by using said electrodes existing on said upper and lower surfaces of said piezoelectric flat plate, said piezoelectric flat plate is deformed in an in-plane direction of said piezoelectric flat plate, said second actuator having one edge portion along one of said upper and lower surfaces thereof coupled to said fixing member, and an other edge portion along the one of said upper and lower surfaces thereof coupled to said elastic member and said piezoelectric flat plate having recesses formed thereon so as to sandwich the two or more polarization regions in said piezoelectric flat plate therebetween.

6. An apparatus according to claim 5, wherein directions of the polarization of the two or more polarization regions in said piezoelectric flat plate are opposite one another.

7. An apparatus according to claim 5, wherein the electrodes on one of either the upper or lower surfaces of said piezoelectric flat plate is a single electrode and the electrodes of an opposite surface to the single electrode is separated into two or more electrodes.

8. A magnetic disk apparatus for writing and reading information on a magnetic disk, comprising:

a magnetic head for writing and reading information;

an elastic member for supporting said magnetic head;

a fixing member for supporting said elastic member;

a first actuator for moving said magnetic head to a predetermined position over said magnetic disk; and a second actuator arranged between said first actuator and said magnetic head, wherein said second actuator comprises a piezoelectric flat plate having recesses to sandwich two or more polarization regions in said piezoelectric flat plate.

9. An apparatus according to claim 8, wherein the recesses are formed at opposite edges of said piezoelectric flat plate so as to sandwich the two or more polarization regions therebetween.

10. An apparatus according to claim 8, wherein said actuator has one edge portion along one of upper and lower surfaces thereof coupled to said fixing member and an other edge portion along the one of the said upper and lower surfaces thereof coupled to said elastic member.

* * * * *